(12) United States Patent
Franc et al.

(10) Patent No.: US 11,505,115 B2
(45) Date of Patent: Nov. 22, 2022

(54) LIGHTING DEVICE FOR A MOTOR VEHICLE

(71) Applicant: VALEO VISION BELGIQUE, Meslin l'Eveque (BE)

(72) Inventors: Alexandre Franc, Meslin l'Eveque (BE); Geoffrey Creus, Meslin l'Eveque (BE); Richard Geloen, Meslin l'Eveque (BE)

(73) Assignee: VALEO VISION BELGIQUE, Meslin L'Eveque (BE)

( * ) Notice: Subject to any disclaimer, the term of this patent is extended or adjusted under 35 U.S.C. 154(b) by 0 days.

(21) Appl. No.: 17/290,593

(22) PCT Filed: Oct. 25, 2019

(86) PCT No.: PCT/EP2019/079255
§ 371 (c)(1),
(2) Date: Apr. 30, 2021

(87) PCT Pub. No.: WO2020/089106
PCT Pub. Date: May 7, 2020

(65) Prior Publication Data
US 2021/0354620 A1    Nov. 18, 2021

(30) Foreign Application Priority Data

Oct. 31, 2018   (FR) ..................... 18 60103

(51) Int. Cl.
*B60Q 1/30* (2006.01)
*F21S 43/50* (2018.01)
(Continued)

(52) U.S. Cl.
CPC .............. *B60Q 1/302* (2013.01); *F21S 43/14* (2018.01); *F21S 43/50* (2018.01); *F21V 15/04* (2013.01); *F21W 2103/35* (2018.01)

(58) Field of Classification Search
CPC ........... F21V 15/04; F21S 43/14; F21S 43/50; B60Q 1/302
See application file for complete search history.

(56) References Cited

U.S. PATENT DOCUMENTS

| 4,893,220 A | 1/1990 | Kakidaira |
| 4,972,303 A | 11/1990 | Machida et al. |
| 5,050,051 A * | 9/1991 | Machida ................ B60Q 1/302 |
| | | 362/503 |

FOREIGN PATENT DOCUMENTS

| FR | 2 943 030 A1 | 9/2010 |
| KR | 10-2012-0046546 A | 5/2012 |

OTHER PUBLICATIONS

International Search Report dated Feb. 3, 2020 in PCT/EP2019/079255 filed on Oct. 25, 2019, 2 pages.

* cited by examiner

*Primary Examiner* — Thomas M Sember
(74) *Attorney, Agent, or Firm* — Oblon, McClelland, Maier & Neustadt, L.L.P.

(57) ABSTRACT

The invention relates to a lighting device (1) for a motor vehicle, comprising: —a housing (10); —a noise-reducing material (11); characterised in that: —the noise-reducing material (11) is partially disposed inside the housing (10) and is in contact with the housing (10); —the housing (10) has at least one hole (100) and the noise-reducing material (11) is configured to pass through the at least one hole (100) and extends projecting from the at least one hole (100) to the outside of the housing (10).

20 Claims, 5 Drawing Sheets

(51) Int. Cl.
*F21S 43/14* (2018.01)
*F21V 15/04* (2006.01)
*F21W 103/35* (2018.01)

LIGHTING DEVICE FOR A MOTOR VEHICLE

TECHNICAL FIELD OF THE INVENTION

The present invention relates to a lighting device for a motor vehicle. It finds a particular, but nonlimiting, application in high mount stop lights of a motor vehicle.

TECHNOLOGICAL BACKGROUND OF THE INVENTION

A high mount stop light known to a person skilled in the art is arranged inside the motor vehicle under the roof in order to be docked against the rear window of the motor vehicle. The high mount stop light comprises a housing. An outer housing will cover the housing of the high mount stop light. A piece of antinoise foam is arranged on an outer face of the housing so as to be in contact with the outer housing. The piece of antinoise foam makes it possible to absorb the noise generated by friction between the housing and the outer housing when the motor vehicle is moving. The piece of foam is cut and then adhesively bonded to the high mount stop light housing manually.

One disadvantage of this prior art is that the fastening lacks precision. In this context, the present invention aims to propose a lighting device for a motor vehicle that makes it possible to resolve the aforementioned disadvantage.

GENERAL DESCRIPTION OF THE INVENTION

Accordingly, the invention proposes a lighting device for a motor vehicle, comprising:
  a housing;
  an antinoise material;
characterized in that:
  the antinoise material is partly arranged inside said housing and is in contact with said housing;
  said housing comprises at least one hole, and said antinoise material is configured to pass through said at least one hole and to extend in a projecting manner from said at least one hole to the outside of said housing.

Thus, the antinoise material which extends in a projecting manner from said at least one hole to the outside of the housing will be in contact with an outer housing of the motor vehicle, thereby making it possible to absorb the shocks due to friction between the housing and the outer housing. By virtue of said at least one hole, the antinoise material always extends in a projecting manner at the same location. The positioning thereof in terms of projection is thus always precise.

According to some nonlimiting embodiments, said lighting device can additionally comprise one or more additional features, taken alone or in any technically possible combination, from among the following:

According to one nonlimiting embodiment, said housing comprises at least one hole, and said antinoise material is configured to pass through said at least one hole and to extend in a projecting manner from said hole to the outside of said housing in such a way as to form at least one point of contact with an outer housing of said motor vehicle.

According to one nonlimiting embodiment, said lighting device is a high mount stop light.

According to one nonlimiting embodiment, said housing comprises a plurality of holes.

According to one nonlimiting embodiment, said antinoise material has a Shore A hardness of between 40 and 90.

According to one nonlimiting embodiment, said lighting device additionally comprises an optical system, and said antinoise material is in contact with said optical system.

According to one nonlimiting embodiment, said antinoise material is in contact with a rear window of said motor vehicle.

According to one nonlimiting embodiment, said housing and said antinoise material are composed of two different materials.

According to one nonlimiting embodiment, said housing and said antinoise material are produced by two-shot injection-molding.

According to one nonlimiting embodiment, said antinoise material is an elastomer.

According to one nonlimiting embodiment, the antinoise material comprises a lip in contact with the rear window of said motor vehicle.

According to one nonlimiting embodiment, the housing comprises a docking step allowing docking between the housing and an outer housing.

BRIEF DESCRIPTION OF THE FIGURES

The invention and its various applications will be better understood upon reading the following description and with reference to the accompanying figures, in which.

DESCRIPTION OF EMBODIMENTS OF THE INVENTION

The elements which are identical, by structure or by function, that appear in the various figures retain the same references, unless stated otherwise.

The lighting device 1 for a motor vehicle 2 according to invention is described with reference to FIGS. 1 to 8.

The term motor vehicle is understood to mean any type of motorized vehicle.

Figure 1:
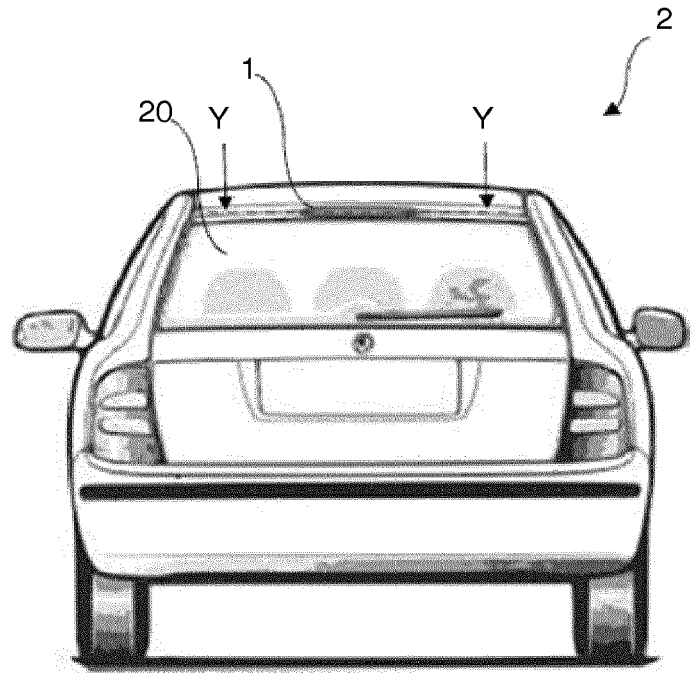
FIG. 1 shows a rear view of a motor vehicle equipped with a lighting device according to one nonlimiting embodiment of the invention.

As illustrated in FIG. 1, the motor vehicle 2 comprises a rear window 20.

The lighting device 1 is a high mount stop light (HMSL), otherwise referred to as third stop light.

As illustrated in FIG. 1, in one nonlimiting embodiment the lighting device 1 extends in a main direction Y which corresponds to the horizontal when it is in a mounting position on the motor vehicle 2. The lighting device 1 illuminates in a longitudinal direction with respect to the motor vehicle 2 that is oriented rearwardly and along an optical emission axis X (illustrated in FIG. 3) close to the horizontal, with the result that an observer located in the optical emission axis X and in the vicinity of this optical emission axis X is able to see the light beam emitted by the lighting device 1.

As illustrated in FIGS. 3, 4a, 4b, 6 and 8, the lighting device 1 comprises:
 a housing 10;
 an antinoise material 11.

The lighting device 1 is retained in the motor vehicle 2 by means of its housing 10.

Figure 4A:
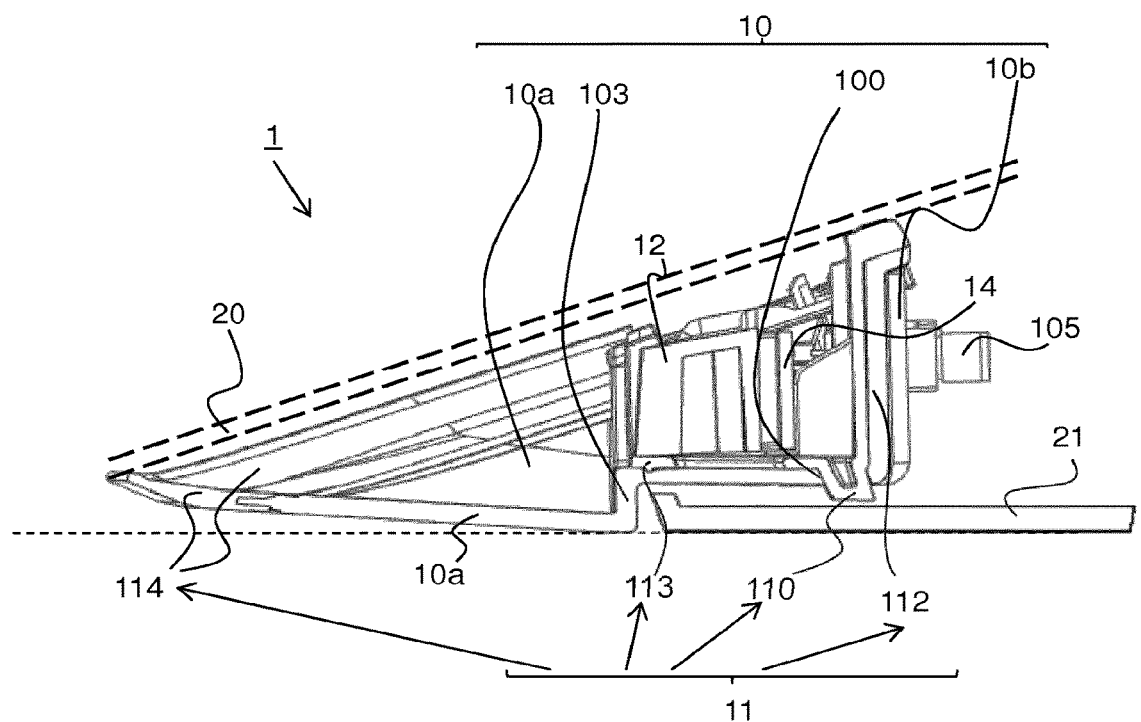
FIG. 4a shows a first view in cross section of the lighting device of FIG. 2.

The lighting device 1 is arranged inside the motor vehicle 2, more particularly under the roof of the motor vehicle and behind the rear window 20, and is partly covered by an outer housing 21, otherwise referred to as the client housing 21. The client housing 21 is illustrated in FIG. 4a. It particularly conceals the means of fastening between the housing 10 and the roof or the rear window 20. The client housing 21 is a trim part of the headliner inside the motor vehicle 2.

In one nonlimiting embodiment, the housing 10 is an open housing. It is configured to bear in part against the rear window 20 (illustrated by a broken line in FIG. 4a) of the motor vehicle 2.

Figure 3:
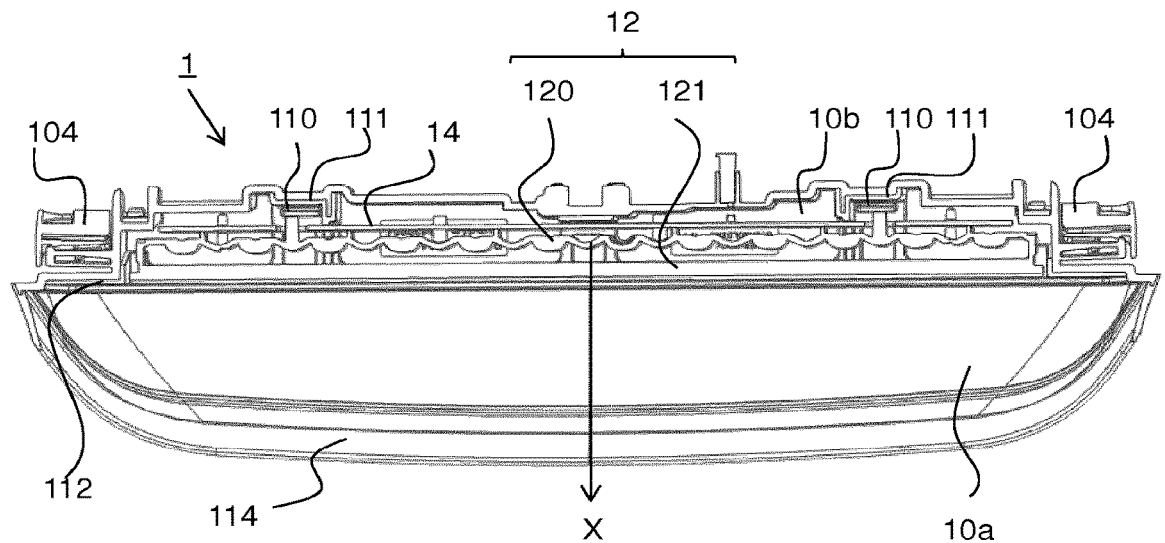
FIG. 3 shows a view in longitudinal section of the lighting device of FIG. 2.

As illustrated in FIG. 3, in one nonlimiting embodiment the lighting device 1 additionally comprises:
 an optical system 12 arranged in the housing 10.

As illustrated in FIG. 3, in one nonlimiting embodiment the lighting device 1 additionally comprises an electronic medium 14 with at least one light source (not illustrated).

The elements of the lighting device 1 are described below.

Electronic Medium 14

Figure 4B:
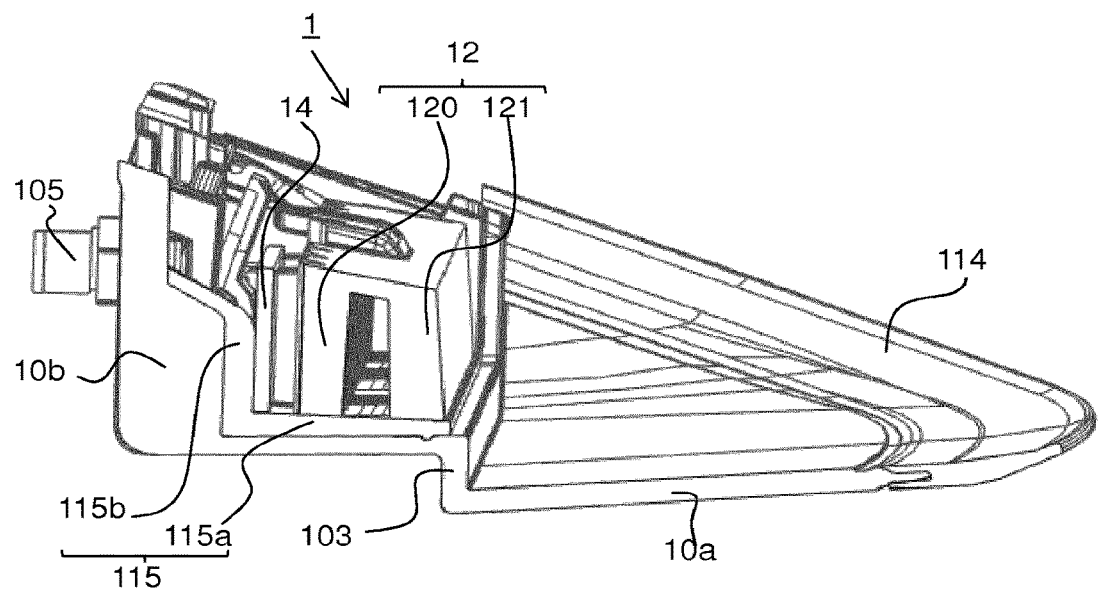
FIG. 4b shows a second view in cross section of the lighting device of FIG. 2.

The electronic medium 14 is illustrated in FIGS. 3, 4a and 4b.

In one nonlimiting embodiment, the electronic medium 14 is a printed circuit board assembly (PCBA). The electronic medium 14 is arranged in the housing 10 facing the optical system 12. It extends in the main direction Y.

One or more light sources are arranged on said electronic medium 14.

In one nonlimiting embodiment, a light source is a semiconductor light source.

In one nonlimiting embodiment, the semiconductor light source forms part of an electroluminescent diode.

The term electroluminescent diode is understood to mean any type of electroluminescent diodes, whether they be, in nonlimiting examples, LEDs (light-emitting diodes), OLEDs (organic LEDs), AMOLEDs (active-matrix-organic LEDs) or else FOLEDs (flexible OLEDs).

A light source is configured to emit light rays which cooperate with the optical system 12 to generate a light beam. Said light beam makes it possible to realize the high mount stop light lighting function.

In one nonlimiting embodiment, the electronic medium 14 comprises a plurality of light sources. This nonlimiting embodiment is taken as an example in the remainder of the description.

Optical System 12

The optical system is illustrated in FIGS. 3, 4a and 4b.

The optical system 12 makes it possible to generate a light beam (not illustrated) from light rays emitted by the light sources. The light beam is directed toward the outside of the housing 10 in the direction of the rear window 20 of the motor vehicle 2.

In one nonlimiting embodiment, the optical system 12 comprises:
 a primary optical element 120;
 a secondary optical element 121.

The primary optical element 120 and the secondary optical element 121 are formed by a transparent or translucent material, similar to a lens.

The primary optical element 120 and the secondary optical element 121 are substantially flat and extend in the main direction Y of the lighting device 1.

The primary optical element 120 is partly arranged so as to face the light sources. It is configured to collimate the light rays of the light sources toward the secondary optical element 121. To this end, the primary optical element 120 comprises Fresnel steps.

The secondary optical element 121 is arranged so as to face the primary optical element 120 in such a way as to receive the light rays R collimated by the primary optical element 140 and to send them in the direction of the rear window 20 of the motor vehicle 2.

Housing 10 and Antinoise Material 11
 Housing 10

The housing 10 is illustrated in FIGS. 2 to 8.

The housing 10 is an open housing which is configured to come to bear against the rear window 20 of the motor vehicle 2.

In one nonlimiting embodiment, the housing 10 is fastened to the body and/or to the rear window 20 of the motor vehicle 2 via fastening tabs 104 which cooperate with fastening means on the motor vehicle. It is fastened under the roof of the motor vehicle 2.

Figure 5:
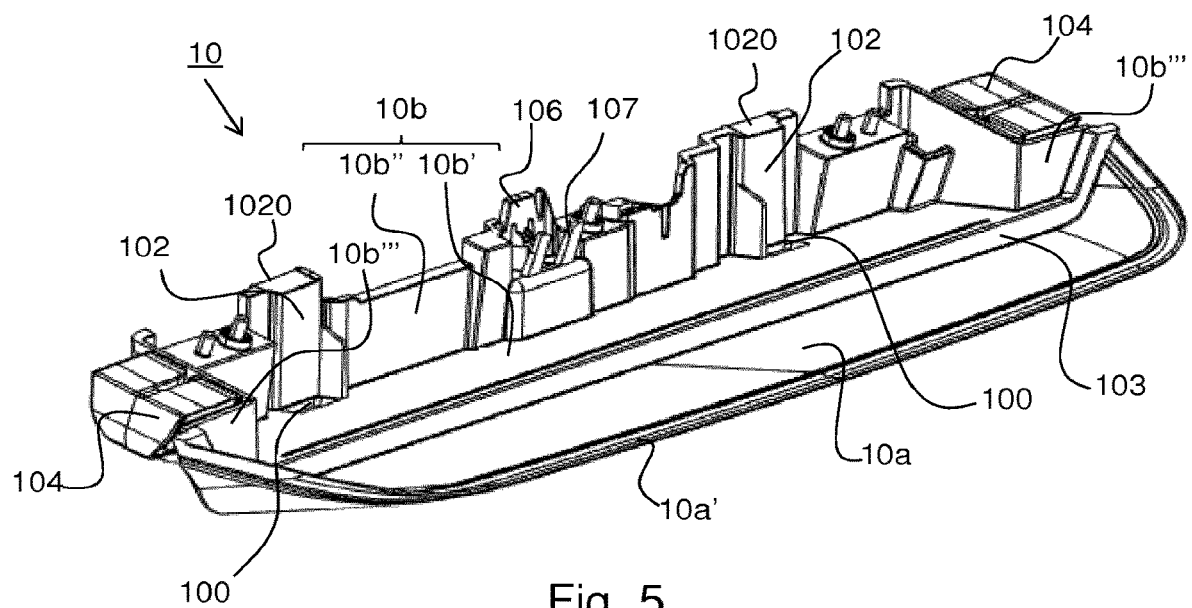
FIG. 5 shows a bottom view of the housing of FIG. 2 according to one nonlimiting embodiment.

As illustrated in FIG. 5, the housing 10 comprises a primary part 10a visible from the interior of the motor vehicle, and a nonvisible secondary part 10b which is configured to be covered by the client housing 21.

As illustrated in FIG. 4a for example, the primary part 10a and the secondary part 10b are separated by a docking step 103. This docking step 103 makes it possible to align the client housing 21 with the housing 10 (along the dotted line). As illustrated in FIG. 5, the primary part 10a comprises an outer periphery 10a'.

As illustrated in FIG. 5, the secondary part 10b comprises two subparts 10b' and 10b" which are relatively perpendicular with respect to one another and of which a first subpart 10b' extends parallel to said primary part 10a.

The second subpart 10b" comprises:
 two ends 10b''' situated on either side of the first subpart 10b' having a shape relative to a right angle;
 at least one supply wall 102 for an injection of one end 1020. In the nonlimiting example illustrated, it comprises two supply walls 102.

The housing 10 comprises at least one hole 100 configured to allow the passage of the antinoise material 11. In one nonlimiting embodiment illustrated, said at least one hole 100 has the shape of a quadrilateral. In nonlimiting embodiment variants, it has a rectangular or square shape.

In a first nonlimiting exemplary embodiment illustrated in FIG. 5, the dimensions of the hole 100 are 15.23×5.21 mm. In a second nonlimiting exemplary embodiment of FIG. 7, the dimensions of the hole 100 are 14×5 mm.

Said at least one hole 100 is produced in the secondary part 10b. It is formed in particular in the first subpart 10b' of the secondary part 10b.

In one nonlimiting embodiment, the housing 10 comprises a plurality of holes 100. In the nonlimiting example of FIG. 5, it comprises 2 holes.

Figure 7:
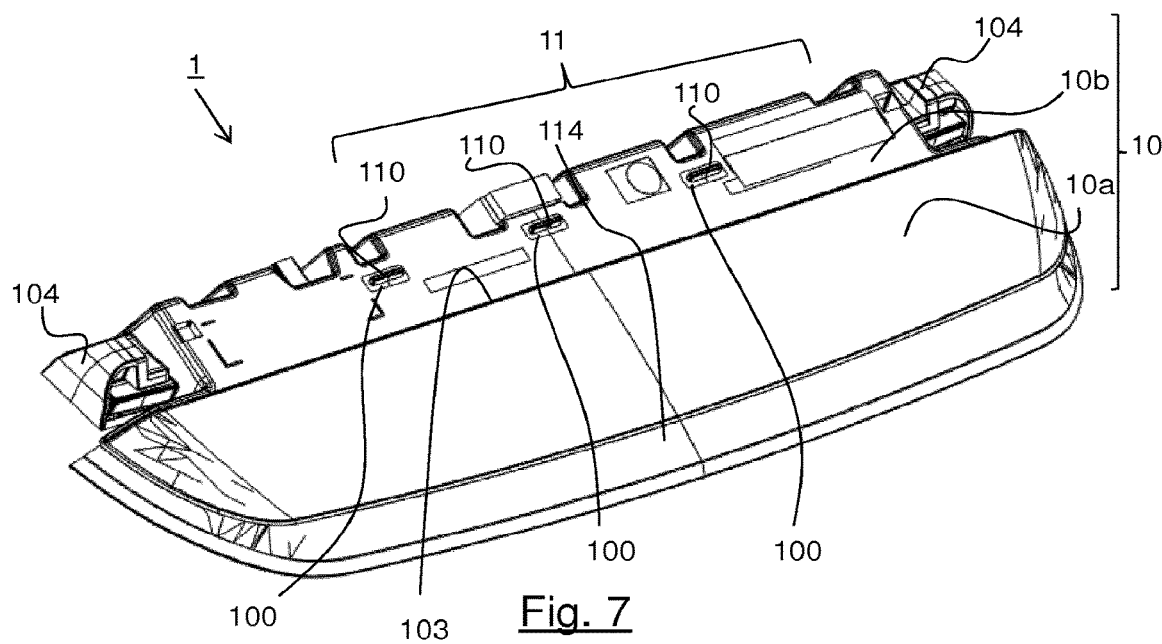
FIG. 7 shows a perspective view of the lighting device of FIG. 1, said lighting device comprising a housing and an antinoise material, according to a second embodiment variant of a nonlimiting embodiment of the invention.

In the nonlimiting example of FIG. 7, it comprises 3 holes. Three holes allow better contact with the client housing 21 and provide better stability.

Figure 2:
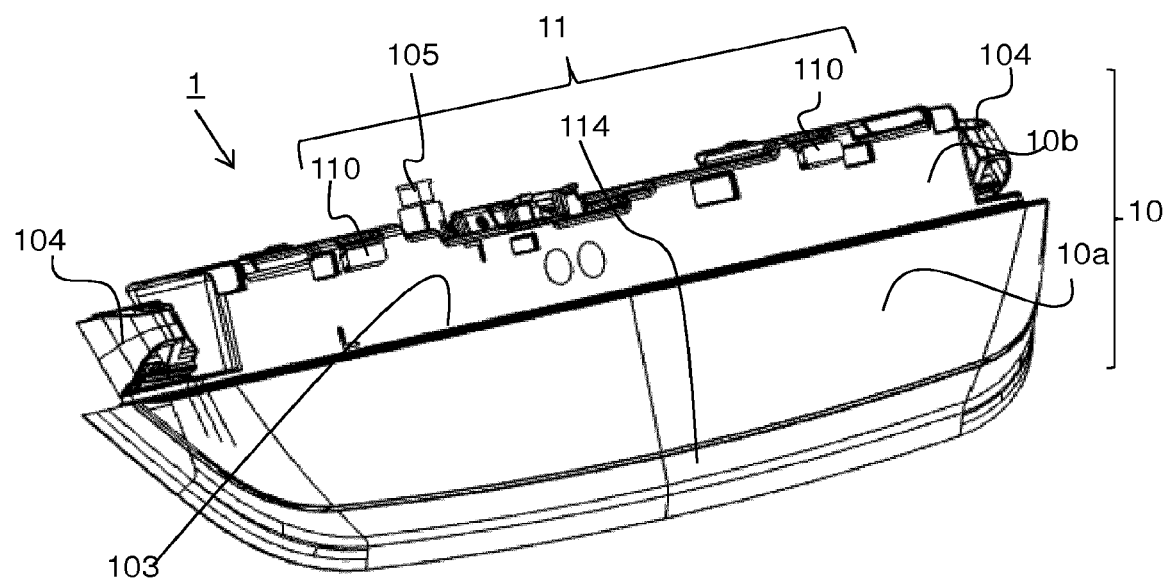
FIG. 2 shows a perspective view of the lighting device of FIG. 1, said lighting device comprising a housing and an antinoise material, according to a first embodiment variant of a nonlimiting embodiment of the invention.

In one nonlimiting embodiment illustrated in FIG. 2 for example, the housing 10 additionally comprises a connector 105 configured to be connected to a client connector (not illustrated) for the electrical supply of the lighting device 1.

Figure 6:
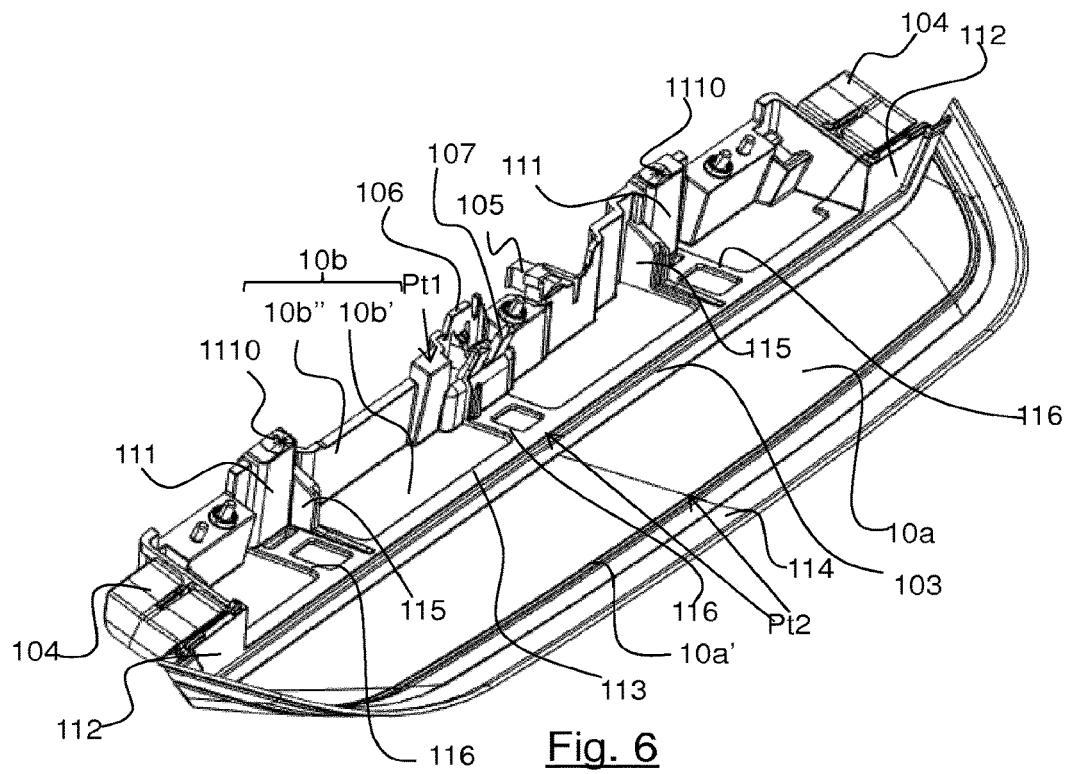
FIG. 6 shows a bottom view of the housing of FIG. 2 with the antinoise material, according to one nonlimiting embodiment.

In one nonlimiting embodiment illustrated in FIGS. 5 and 6, the housing 10 additionally comprises a fastening clip 106 for fastening the optical system 12.

In one nonlimiting embodiment illustrated in FIGS. 5 and 6, the housing 10 additionally comprises a positioning tab 107 for positioning the optical system 12.

Antinoise Material 11

As illustrated in the sectional views of FIGS. 4a and 4b, the antinoise material 11 is partly arranged inside said housing 10 and is in contact with said housing 10.

In one nonlimiting embodiment, the housing 10 and the antinoise material 11 are composed of two different materials. In one nonlimiting embodiment, they are produced by two-shot injection-molding. In one nonlimiting embodiment illustrated in FIGS. 6 and 8, there is an injection point Pt1 for the housing 10 (at the second subpart 10b'') and two injection points Pt2 for the antinoise material 11 (at the outer periphery 10a' and at the docking step 103).

The two-shot injection-molding makes it possible to reduce the assembly costs and the assembly time, since the housing 10 and the antinoise material 11 come out of a single mold and form only a single part. By virtue of the two-shot injection-molding, an assembly step relating to the antinoise material is thus dispensed with.

In one nonlimiting embodiment, the housing 10 is produced from a rigid material. It makes it possible to ensure that the optical system 12 and the electronic medium 14 are retained in the housing 10, and to have a resistance to vibrations when the motor vehicle is moving.

In one nonlimiting embodiment, the material of the housing 10 is PC (polycarbonate), ABS (acrylonitrile butadiene styrene) or ABS-PC.

It will be noted that the client housing 21 is likewise made of rigid material.

In one nonlimiting embodiment, the antinoise material 11 is a flexible material. It makes it possible to absorb the shocks due to the friction of the housing 10 against the client housing 21, against the optical system 12 and against the rear window 20. Thus, it eliminates the noise due to this various friction. In one nonlimiting embodiment, the antinoise material 11 has a Shore A hardness of between 40 and 90.

In one nonlimiting embodiment, the material constituting the antinoise material 11 is an elastomer, in particular a thermoplastic elastomer. In one nonlimiting embodiment variant, the material is TPV (vulcanized olefinic TPE). In another nonlimiting embodiment variant, the material is TPU (polyurethane TPE).

As illustrated in FIG. 4a, the antinoise material 11 passes through said at least one hole 100 and extends in a projecting manner from said at least one hole 100 to the outside of said housing 10. It thus comprises a projecting part 110 configured to come into contact with the client housing 21. That avoids the housing 10 having to be in direct contact with the client housing 21. The shocks due to friction between the housing 10 and the client housing 21 are thus absorbed. The noise due to this friction is thus eliminated. In the nonlimiting example of FIG. 2, there are two projecting parts 110. In the nonlimiting example of FIG. 7, there are three projecting parts 110.

In one nonlimiting embodiment, the antinoise material 11 comprises the same dimensions as the hole 100. Thus, in the first nonlimiting exemplary embodiment illustrated in FIG. 5, the dimensions of the projecting part 110 of the antinoise material 11 are 15.23×5.21 mm.

In another nonlimiting embodiment, the antinoise material 11 comprises smaller dimensions than those of the hole 100. Thus, in the second nonlimiting exemplary embodiment of FIG. 7, the dimensions of the projecting part 110 of the antinoise material 11 are 11×1.9 mm.

It will be noted that the height of the antinoise material 11 depends on the height of the docking step 103, on the thickness of the client housing 21 and on the clearance required by the client between the antinoise material 11 and the client housing 21. Thus, in some nonlimiting examples, the clearance between the projecting part 110 of the antinoise material 11 can be zero or equal to approximately 0.5 mm.

Figure 8:
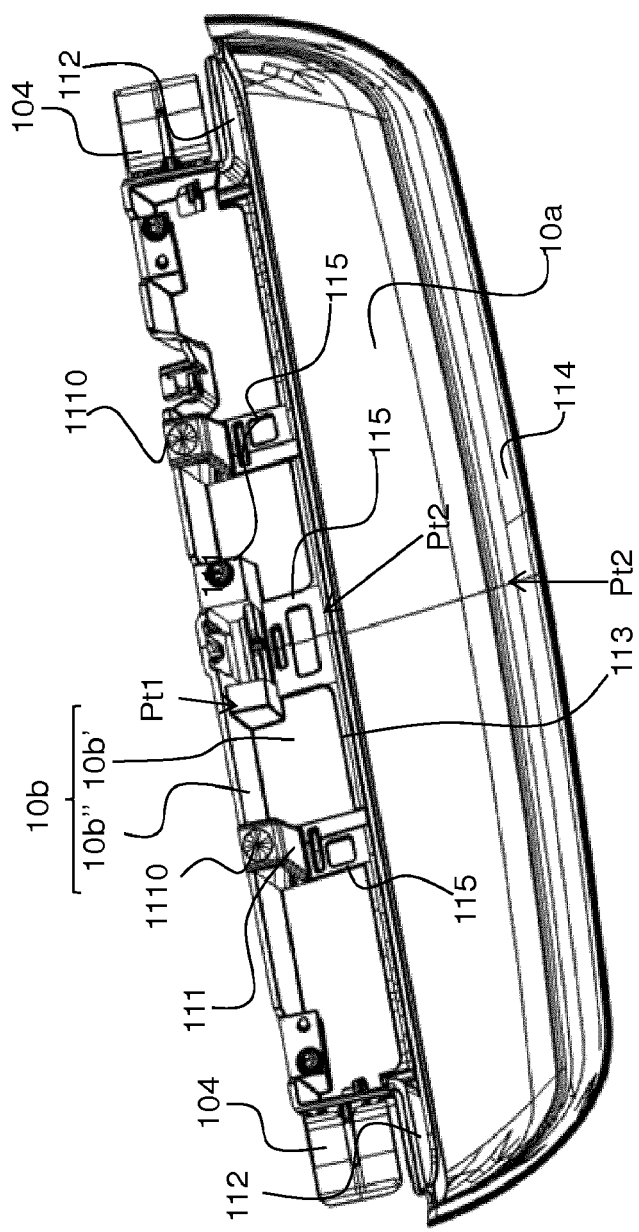
FIG. 8 shows a bottom view of the housing of FIG. 7 with the antinoise material, according to one nonlimiting embodiment.

Moreover, the antinoise material 11 is in contact with said rear window 20. For this purpose, as illustrated in FIGS. 6 and 8, the antinoise material 11 covers said at least one supply wall 102 in order to form at least one point of contact 1110, at the end 1020 of said supply wall 102, with the rear window 20 of the motor vehicle 2. The part of the antinoise material 11 that covers a supply wall 102 is referenced 111. Thus, the antinoise material 11 will bear against the rear window 20 at its contact points 1110.

The housing 10 thus comes to bear against the rear window 20 of the motor vehicle 2 at said at least one contact point 1110. That avoids the housing 10 having to be in direct contact with the rear window 20. The shocks due to friction between the housing 10 and the rear window 20 are thus absorbed. The noise due to this friction is thus eliminated. In one nonlimiting example illustrated in FIGS. 6 and 8, there are two contact points 1110.

In one nonlimiting embodiment, the projecting part 110 described above is connected to the part 111.

As illustrated in FIG. 4b, in addition, the antinoise material 11 is in contact with said optical system 12. In particular, the antinoise material 11 comprises at least one part 115 in contact with the optical system 12. That avoids the housing 10 having to be in direct contact with the optical system 12. The shocks due to friction between the housing 10 and the optical system 12 are thus absorbed. The noise due to this friction is thus eliminated.

As illustrated in FIG. 4b, the part 115 is formed:
- by a base 115a in contact with the primary optical element 120 and the secondary optical element 121 of the optical system 12. The base 115 bears against the primary part 10b of the housing 10, in particular against the subpart 10b';
- by a buttress 115b in contact with the electronic board assembly 14. The buttress 115b is situated at approximately 90° with respect to the base 115a and bears against the primary part 10b of the housing 10, in particular against the subpart 10b''.

In the nonlimiting example illustrated, the antinoise material 11 comprises two parts 115.

As illustrated in FIGS. 3, 4a, 4b, 6 and 8, the antinoise material 11 extends along the outer periphery 10a' of the primary part 10a of the housing 10. In particular, it comprises a lip 114 which extends along said outer periphery 10a'. Thus, the housing 10 is configured to also come to bear against the rear window 20 via the antinoise material 11, in particular all along its lip 114. The housing 10 is thus not in direct contact with the rear window 20. The shocks due to friction between the housing 10 and the rear window 20 are thus absorbed. The noise due to this friction is thus eliminated. The lip 114, which is flexible, allows the housing 10 to come to bear correctly against the rear window 20 without having any clearance with the rear window 20. Thus, there is no return of the light beam in the interior and toward the front of the motor vehicle 2.

It will be noted that, on account of the production by two-shot injection-molding, the various parts 110, 111 and 114 of the antinoise material 11 are interconnected by various connection parts.

Thus, as illustrated in FIG. 6, in one nonlimiting embodiment the antinoise material 11 additionally comprises two connection parts 112 in contact with the ends 10b''' of the housing 10. These two parts 112 tightly follow the right-angled shape of the ends 10b'''. These are injection zones for supplying the lip 114, which is described later on, and they connect a longitudinal connection part 113 and the lip 114.

As illustrated in FIG. 6, in one nonlimiting embodiment the antinoise material 11 additionally comprises a longitudinal connection part 113 which connects the two parts 112 to at least one transverse connection part 116. This longitudinal connection part 113 extends along the housing 10, in particular along the docking step 103.

As illustrated in FIG. 6, in one nonlimiting embodiment the antinoise material 11 additionally comprises at least one transverse connection part 116 which connects a part 111 to the longitudinal connection part 113.

In the nonlimiting example illustrated, it comprises two transverse connection parts 116 which respectively connect the two parts 111 to said longitudinal connection part 113. These transverse connection parts 116 comprise holes to reduce the weight of the antinoise material 11.

Of course, the description of the invention is not restricted to the embodiments described above.

Thus, in another nonlimiting embodiment, the optical system 12 comprises one or more collimators.

Thus, in another nonlimiting embodiment, the optical system 12 comprises one or more lenses.

Thus, in another nonlimiting embodiment, the optical system 12 comprises a Fresnel system and one or more lenses.

Thus, in other nonlimiting embodiments, said at least one hole 100 can have any other geometric shape.

Thus, the described invention particularly has the following advantages:

it makes it possible to obtain precise and repeatable positioning of the antinoise material 11 by virtue of the hole(s) 100;

it makes it possible to reduce the positioning tolerances of the antinoise material 11. Thus, there is a switch to a more or less 0.2 mm tolerance versus a more or less 0.8 mm tolerance with a piece of foam;

by dispensing with the piece of foam of the prior art, the invention makes it possible:
  to dispense with the cutting operations and the associated lack of precision;
  to dispense with manual assembly;
  to save assembly time;
  dispense with provisioning of the lighting device 1 on the assembly line and with the references associated with each different piece of foam;
  dispense with the management of the diversity of the pieces of foam;
  dispense with the need to turn over the lighting device 1 on the assembly line as is necessary for adhesive bonding of a piece of foam;
  dispense with the presence and positioning monitoring by a camera for the antinoise material 11;
  dispense with the problem of visibility to a camera of a piece of black foam if the housing 10 is itself black;
  reduce the cost of the lighting device 1;
the invention makes it possible to obtain a variable geometry of the antinoise material 11, in particular of its projecting parts 110, by virtue of an upstream design of an injection mold;
the invention makes it possible with a single antinoise material 1, which is in contact with the rear window 20, the optical system 2 and the client housing 21, to eliminate the various noise due to the friction between the housing 10 and these three elements 20, 2 and 21.

The invention claimed is:

1. A lighting device for a motor vehicle, comprising:
a housing; and
an antinoise material, wherein:
the antinoise material is partly arranged inside said housing and is in contact with said housing, and
said housing comprises at least one hole, and said antinoise material is configured to pass through said at least one hole such that the antinoise material completely closes the at least one hole and extends in a projecting manner from said at least one hole to the outside of said housing.

2. The lighting device as claimed in claim 1, in which said lighting device is a high mount stop light.

3. The lighting device as claimed in claim 2, in which said housing comprises a plurality of holes.

4. The lighting device as claimed in claim 2, in which said antinoise material has a Shore A hardness of between 40 and 90.

5. The lighting device as claimed in claim 2, in which said lighting device additionally comprises an optical system, and said antinoise material is in contact with said optical system.

6. The lighting device as claimed in claim 2, in which said antinoise material is in contact with a rear window of said motor vehicle.

7. The lighting device as claimed in claim 2, in which said housing and said antinoise material are composed of two different materials.

8. The lighting device as claimed in claim 2, in which said housing and said antinoise material are produced by two-shot injection-molding.

9. The lighting device as claimed in claim 2, in which said antinoise material is an elastomer.

10. The lighting device as claimed in claim 1, in which said housing comprises a plurality of holes.

11. The lighting device as claimed in claim 10, in which said antinoise material has a Shore A hardness of between 40 and 90.

12. The lighting device as claimed in claim 10, in which said lighting device additionally comprises an optical system, and said antinoise material is in contact with said optical system.

13. The lighting device as claimed in claim 10, in which said antinoise material is in contact with a rear window of said motor vehicle.

14. The lighting device as claimed in claim 10, in which said housing and said antinoise material are composed of two different materials.

15. The lighting device as claimed in claim 1, in which said antinoise material has a Shore A hardness of between 40 and 90.

16. The lighting device as claimed in claim 1, in which said lighting device additionally comprises an optical system, and said antinoise material is in contact with said optical system.

17. A lighting device for a motor vehicle, comprising:
a housing; and
an antinoise material, wherein:
   the antinoise material is partly arranged inside said housing and is in contact with said housing, and
   said housing comprises at least one hole, and said antinoise material is configured to pass through said at least one hole and to extend in a projecting manner from said at least one hole to the outside of said housing, wherein said antinoise material is in direct contact with a rear window of said motor vehicle.

18. The lighting device as claimed in claim 1, in which said housing and said antinoise material are composed of two different materials.

19. The lighting device as claimed in claim 1, in which said housing and said antinoise material are produced by two-shot injection-molding.

20. The lighting device as claimed in claim 1, in which said antinoise material is an elastomer.

\* \* \* \* \*